United States Patent
Ouyang et al.

(10) Patent No.: US 11,061,927 B2
(45) Date of Patent: Jul. 13, 2021

(54) OPTIMIZATION OF RELOCATED QUERIES IN FEDERATED DATABASES USING CROSS DATABASE TABLE REPLICAS

(71) Applicant: SAP SE, Walldorf (DE)

(72) Inventors: Yinghua Ouyang, Xi'an (CN); Priya Sharma, Pune (IN); Mahendra Chavan, Pune (IN)

(73) Assignee: SAP SE, Walldorf (DE)

( * ) Notice: Subject to any disclaimer, the term of this patent is extended or adjusted under 35 U.S.C. 154(b) by 177 days.

(21) Appl. No.: 16/373,691

(22) Filed: Apr. 3, 2019

(65) Prior Publication Data

US 2020/0320094 A1    Oct. 8, 2020

(51) Int. Cl.
*G06F 17/00* (2019.01)
*G06F 16/27* (2019.01)
*G06F 16/2453* (2019.01)
*G06F 16/25* (2019.01)

(52) U.S. Cl.
CPC ........ *G06F 16/27* (2019.01); *G06F 16/24549* (2019.01); *G06F 16/256* (2019.01)

(58) Field of Classification Search
None
See application file for complete search history.

(56) References Cited

U.S. PATENT DOCUMENTS

| | | | |
|---|---|---|---|
| 10,205,780 B2* | 2/2019 | Klose | H04L 67/1097 |
| 10,248,704 B2* | 4/2019 | Rath | G06F 16/273 |
| 2005/0182888 A1* | 8/2005 | Murotani | G06F 11/1451 |
| | | | 711/1 |
| 2005/0210010 A1* | 9/2005 | Larson | G06F 16/2457 |
| 2006/0053261 A1* | 3/2006 | Prahlad | G06F 3/0685 |
| | | | 711/162 |
| 2009/0119395 A1* | 5/2009 | Kodama | H04L 67/10 |
| | | | 709/223 |
| 2009/0234799 A1* | 9/2009 | Betawadkar-Norwood | |
| | | | G06F 16/2471 |
| 2011/0302032 A1* | 12/2011 | Ishii | G06Q 30/0255 |
| | | | 705/14.53 |
| 2012/0089566 A1* | 4/2012 | Effern | G06F 16/2379 |
| | | | 707/611 |
| 2013/0339298 A1* | 12/2013 | Muller | G06F 11/1415 |
| | | | 707/640 |
| 2014/0279905 A1* | 9/2014 | Muniswamy-Reddy | |
| | | | G06F 16/27 |
| | | | 707/639 |

(Continued)

*Primary Examiner* — Hasanul Mobin
(74) *Attorney, Agent, or Firm* — Sterne, Kessler, Goldstein & Fox P.L.L.C.

(57) ABSTRACT

Disclosed herein are system, method, and computer program product embodiments for appropriately routing requests for data stored in multiple storage mediums. An embodiment operates by maintaining a first and second data stored on a first storage medium in communication with a second storage medium. Thereafter, a replicate of the first data stored in the first storage medium may be created for the second storage medium to store a replica data mirroring the first data. Subsequently, a request for retrieval of the first data may be received. Afterward, a previous update time of the second storage medium in receiving the replicate of the first data stored in the first storage medium may be determined. Lastly, based on the previous update time, the request may be forwarded to the first storage medium or second storage medium.

20 Claims, 4 Drawing Sheets

(56) References Cited

U.S. PATENT DOCUMENTS

| | | | |
|---|---|---|---|
| 2014/0279931 A1* | 9/2014 | Gupta | G06F 16/27 |
| | | | 707/683 |
| 2014/0372374 A1* | 12/2014 | Bourbonnais | G06F 16/27 |
| | | | 707/613 |
| 2016/0196320 A1* | 7/2016 | Borowiec | G06F 11/1451 |
| | | | 707/624 |
| 2016/0350391 A1* | 12/2016 | Vijayan | G06F 3/0619 |
| 2018/0285214 A1* | 10/2018 | Ashraf | G06F 16/128 |

* cited by examiner

OPTIMIZATION OF RELOCATED QUERIES IN FEDERATED DATABASES USING CROSS DATABASE TABLE REPLICAS

BACKGROUND

Database systems traditionally store data among multiple storage mediums capable of processing requests for data at different speeds. However, database systems typically have a difficult time maintaining storage of the data at the appropriate storage mediums to properly and timely process requests for specific data. For example, data may be frequently requested from storage mediums having slower processing times than other storage mediums in the system. Likewise, requests may be received, and data may be transmitted, by storage mediums having "stale" or "old" data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for appropriately routing requests for data stored in multiple storage mediums.

Figure 1:
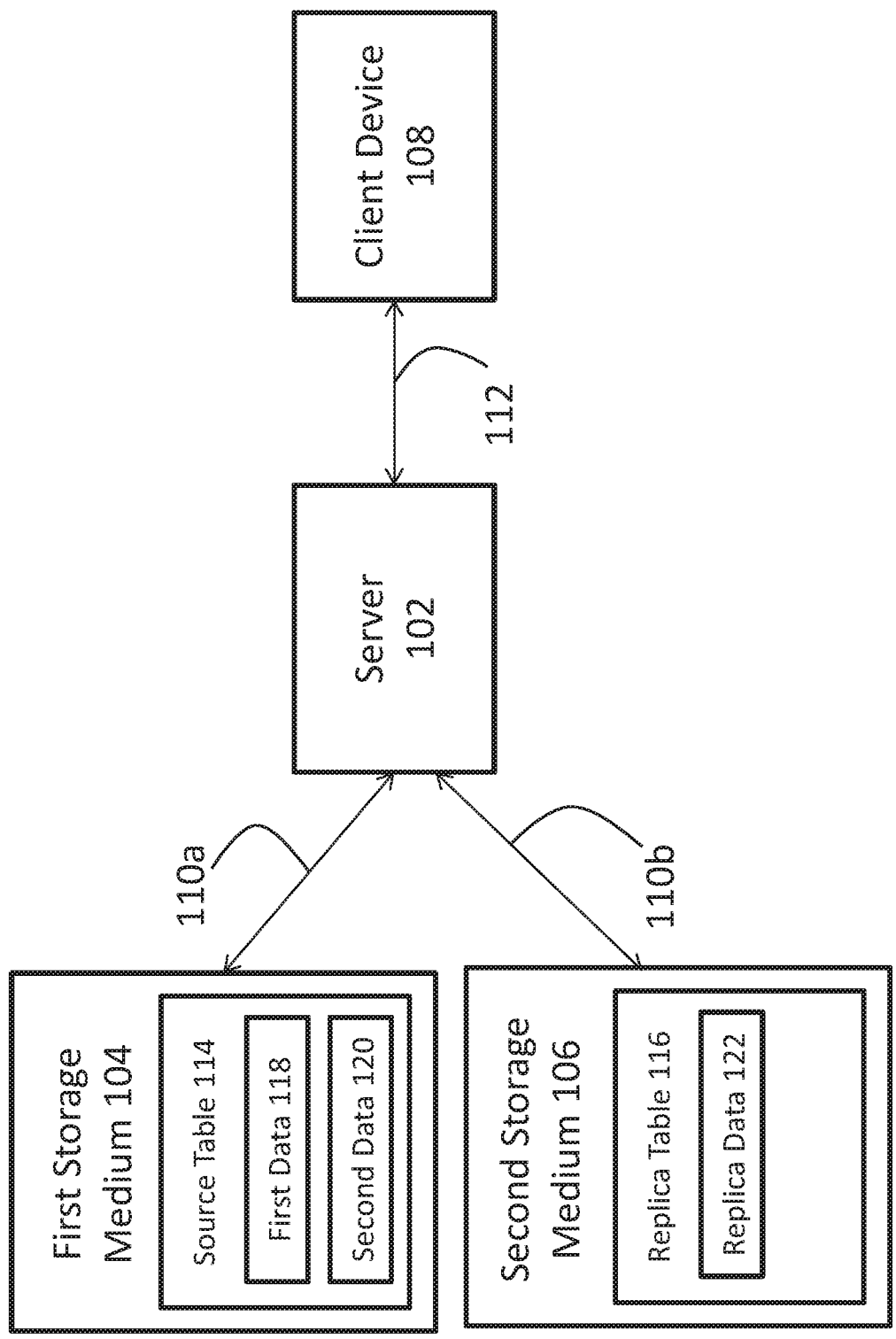
FIG. 1 is a block diagram of a system for appropriately routing requests for data stored in multiple storage mediums, according to some embodiments.

FIG. 1 illustrates a system 100 that may include a server 102, a first storage medium 104, a second storage medium 106, and one or more client devices 108. It is noted that while the example of FIG. 1 includes two storage mediums 104, 106, in practice the system 100 may include any number of storage mediums, and the teachings of this disclosure apply to those alternative configurations.

The server 102, the first storage medium 104, and the second storage medium 106 may be managed by an entity (e.g., an organization), and the client devices 108 may be entity-owned devices or consumer-owned devices. Moreover, the first storage medium 104 and the second storage medium 106 may relate to different types of storage mediums. For example, the first storage medium 104 may be a memory-based storage, and the second storage medium 106 may be an in-disk based medium. As such, the first storage medium 104 may be capable of processing at a higher speed than the second storage medium 106. In other words, the first storage medium 104 may have faster processing power and data access than the second storage medium 106.

The first storage medium 104 and the second storage medium 106 may store data, and the server 102 may act as a point of communication for the client devices 108. Similarly, the client devices 108 may store data onto the first storage medium 104 and/or the second storage medium 106, and/or request data stored in the first storage medium 104 and/or the second storage medium 106, via the server 102. As such, the client devices 108 may not be in direct communication with the first storage medium 104 and/or the second storage medium 106.

Along these lines, the server 102 may be in communication with the first storage medium 104 and the second storage medium 106 via communication medium or line 110. The server 102 may also be in communication with the client devices 108 via a communication medium or line 112. The communication lines 110 and 112 may be private or public. For example, when the server 102 and the first and second storage mediums 104 and 106 are managed by an entity and the client devices 108 are entity-owned devices, the communications lines 110 and 112 may both be a private. Alternatively, when the server 102 and the first and second storage mediums 104 and 106 are managed by an entity and the client devices 108 are consumer-owned devices, the communication line 110 may be private, and the communication line 112 may be private or public.

Further, the server 102 may manage data storage between the first storage medium 104 and the second storage medium 106. As such, the server 102 may receive and store data in the first storage medium 104. After a predetermined amount of time (e.g., seconds or minutes, or some other time period), the server 102 may replicate the data stored in the first storage medium 104 for the second storage medium 106. As such, the first storage medium 104 may serve as storage for receipt of new or incoming data, and the second storage medium 106 may serve as storage for replicated data of the first storage medium 104. Along these lines, in some embodiments, the first storage medium 104 may be used primarily for write-intensive operations, and the second storage medium may 106 may be used primarily for read-intensive operations. By operating in such a fashion, the server 102 may provide asynchronous data replication through which the second storage medium 106 may be refreshed with changes made to the first storage medium 104 after a predetermined amount of time, for instance, every minute or any other configurable time period. However, as will be detailed below, if the second storage medium 106 is not refreshed within an acceptable update time, the first storage medium 104 may also be used for read operations.

As stated above, the first storage medium 104 and the second storage medium 106 may be a memory-based storage medium and an in-disk based storage medium, respectively. As such, the first storage medium 104 may provide faster processing and data access than the second storage medium 106. And, the second storage medium 106 may provide slower processing and data access than the first storage medium 104. Alternatively, depending on the amount of data and/or type of the data, the first storage medium 104 and the second storage medium 106 may be in-disk based storage medium and a memory based storage medium, respectively. The server 102's process of replicating the data from the first storage medium 104 may begin with replicating a portion of the data that is less than all of the data stored on the first storage medium 104. As such, the first storage medium 104 may be considered to store first data 118 and second data 120. In some embodiments, the server 102's process may create replica data 122 mirroring the first storage medium 104 and the second storage medium 106.

In some embodiments, the first storage medium 104 may maintain a source table 114 receiving new and/or updated data. As such, the first storage medium 104's source table 114 may contain the first data 118 and the second data 120.

And, the server 102's process may include creating a replica table 116 for maintaining the replica data 122.

To create the replica table 116, the server 102 may first replicate properties of the source table 114 stored in the first storage medium 104. Properties of the source table 114 may include a name, a version, a number of columns, and/or a number of rows of the table, as well as other information. After replicating the properties and the first data 118 of the source table 114, the server 102 may associate the first data 118 with the various properties of the source table 114. The server 102 may then create the replica table 116 having the same properties as the source table 114 and containing the replica data 122 corresponding to the first data 118. Thereafter, the server 102 may store the replica table 116 on the second storage medium 106.

In the replicating of the first data 118 from the first storage medium 104 to the second storage medium 106, the server 102 may utilize filter conditions to remove select data from the source table 114. The select data may relate to the first data 118 being copied. As such, the filter conditions may permit the second storage medium 104 to not receive the select data relating to the first data 118. Along these lines, the select data may also not be data that is replicated later (where such select data that is not later replicated is herein represented by the second data 120 in FIG. 1). The select data may be specified by an authorized individual (e.g., an individual authorized by an entity managing the server 102 and the first and second storage mediums 104 and 106).

During the server 102's process of copying the first data 118 from the first storage medium 104, the server 102 may provide the second storage medium 106's replica table 116 with a status. This status may permit retrieval of the replica data 116 from the second storage medium 106 upon receipt of requests from client devices 108. For example, the status may be "DISABLED," "ENABLING," or "ENABLED." The "DISABLED" and "ENABLING" statuses may not permit data (e.g., the first data) to be retrieved from second storage medium 106, and the "ENABLED" status may permit data to be retrieved from the second storage medium 106. As such, when the replica table 116 is first created, it may be in a "DISABLED" state. After the replica data 122 is inputted into the replica table 116, the replica table 116 may move to an "ENABLING" state. If an error occurs during the synchronization process, the replica table 116 may return to the "DISABLED" state. After the synchronization completes, the replica table 116 may reach the "ENABLING" state with a special code of "Waiting for Log Replay." If an error occurs, the replica table 116's state is changed to "DISABLED" and the special code is cleared. After a transactional replay is performed, the replica table 116's state may be changed to "ENABLED" and the special code of "Waiting for Log Replay" may be cleared.

As such, through the process of replicating the first data 118 stored in the first storage medium 104, the server 102 can update the second storage medium 106 based on new and/or updated data received from the first storage medium 104. As stated above, the first storage medium 104 may store the source table 114 containing first data 118 and second data 120, and the second storage medium 106 may store the replica table 116 containing the replica data 122 of the first data 118. Accordingly, the new and/or updated data received by the first storage medium 104's source table 114 may relate to all of the data stored in the second storage medium 106's replica table 116, or only a portion thereof. This may allow the server 102 to provide the second storage medium 106 with full backups, partial backups, incremental backups (e.g., any changes since the last partial backup), and differential backups (any changes since the last full backup).

Along these lines, when the first storage medium 104 receives new and/or updated data, the server 102 may create a log of transactions to monitor the new and/or updated data added to the first storage medium 104. The log of transactions may be maintained for a period of time equal to the previous update time of the second storage medium 106, which will be described in more detail below. This may allow the second storage medium 106 to be updated with the appropriate data.

As such, the server 102 may perform a log replay to identify transactions from the log of transactions to include in the replica table 116. As stated above, during the log replay, the server 102 may provide the replica table 116 with the "ENABLING" state with a special code of "Waiting for Log Replay." After the server 102 performs the log replay, the server 102 may mark replica table 116 with the "ENABLED" state and clear the special code. By having these multiple state, the server 102 avoids an inconsistent transactional state.

Moreover, the server 102 may receive requests from client devices 108 for updating the second storage medium 106. As such, the requests may be received during the server 102's process of replicating the data from the first storage medium 104 (e.g., before completion thereof). For example, the request may be for first data 118 stored in the first storage medium 104 and the second storage medium 106, whereas additional data (e.g., second data 120) may also be stored in the first storage medium 104.

The requests may be for the first data 118 or the second data 120. As such, the requests may be for data that is in the process of being replicated onto the second storage medium 118 or for data that has already been replicated. Accordingly, the requests may result in accessing the source table 114's first data 118, or the replica table 116's replica data 122.

Along these lines, in sending the request to the server 102, a client at the client devices 108 may be unaware of a location of the data being requested (e.g., whether stored in the first storage medium 104 or the second storage medium 106). As such, the request may not contain information indicative of the location of the data being requested. In the same vein, upon receipt of the data, the client at the client devices 108 may be unaware of where the data was originally transmitted from (i.e., whether from the first storage medium 104 or the second storage medium 106). For example, the client at the client devices 108 may be unaware of whether the received data corresponds to the first data 118 accessed from the first storage medium 104, or the replica data 122 accessed from the second storage medium 106.

After receipt of the requests, the server 102 may determine a previous update time of the second storage medium 106 for updating the second storage medium 106's replica table 116 with data (e.g., the first data) from the first storage medium 104. As such, the previous update time may be a period of time between a first point of time that the second storage medium 106 receives first data 118 from the first storage medium 104, and a second point of time of receiving the request for the first data 118 from the client devices 108.

Accordingly, to determine the previous update time of the second storage medium 106's replica table 116, the server 102 may provide data received by the first storage medium 104's source table 114 (e.g., first data 118 and second data 120) and the second storage medium 106's replica table 116 (e.g., replica data 122) with timestamps. The server 102 may then compare the latest timestamp of the replica data 122 stored in the second storage medium 106's replica table 116 to the latest timestamp of the data currently in the first storage medium 104's source table 114. Thus, if the first storage medium 104's source table 114 contains no new data, the latest timestamp of the source table 114's existing data (e.g., first data 118 and second data 120) may be equal to latest timestamp of the replica table 116's existing data (e.g., replica data 122) and thus the acceptable update time may be zero. On the other hand, if the first storage medium 104's source data contains new data, the latest timestamp of the source table 114's existing data (e.g., first data 118 and second data 120) may be later than the latest timestamp of the replica table 116's existing data (e.g., replica data 122) and thus the acceptable update time may be a non-zero number (e.g., 10 seconds).

The server 102 may then compare the previous update time to an acceptable update time to determine if the replica data 122 is not current (or, put another way, "stale") or current (or, put another way, not "stale"). The acceptable update time may a difference from a time that first storage medium 104's source table 114 was provided with the original data (e.g., the first data 118) and a time that the second storage medium 106's replica table 116 was provided with the replica data 122 (e.g., of the first data). For example, the acceptable update time may be 10 seconds. As such, it may be sufficient if the first storage medium 104's source table 114 was provided with new data within 10 seconds of the last update of the second storage medium 106's replica table 116.

The acceptable update time may be included in the request for data. For example, the request for data may include, in a structure querying language, an acceptable update time for which data in the second storage medium 106 may be read. Alternatively, the acceptable update time may be provided by an authorized individual (e.g., an individual authorized by an entity managing the server 102 and the first and second storage mediums 104 and 106).

Based on the comparison of the previous update time to the acceptable update time, the server 102 may forward the request for retrieval of the data to the first storage medium 104 or the second storage medium 106. For example, as stated above, the first storage medium 104 may store first data 118 and the second data 120, and the second storage medium 106 may also store the first data 118 (that is, the replica data 122). Accordingly, if the previous update time meets or exceeds the acceptable update time (such that the replica data 122 is stale), the server 102 may forward the request to the first storage medium 104. Alternatively, if the previous update time is less than the acceptable update time (such that the replica data 122 is current or not stale), the server 102 may forward the request to the second storage medium 106. The first storage medium 104 may utilize the source table 114, and the second storage medium 106 may utilize the replica table 116, as discussed above.

Also, upon receipt of the request for data from the client devices 108, the server 102 may determine whether the data stored in the second storage medium 106 has one or more updates, as discussed above. As such, the server 102 may compare the data (e.g., the replica data 122 corresponding to the first data 118) stored in the second storage medium 106 to the same data (e.g., the first data 118) stored in first storage medium 104. Depending on the nature of the updates, the server 102 may route the request to the first storage medium 104 or the second storage medium 106.

For example, as mentioned above, the first storage medium 104 and the second storage medium 106 may store a replica table 116 maintaining the same portion of data (e.g., the replica data 122 corresponding to the first data 118) and having various properties. As noted above, the properties of the replica table 116 may be a name, a version, a number of columns, and/or a number of rows of the source table 114. As described above, in creating the replica table 116 for the second storage medium 106, the server 102 may utilize filter conditions. Accordingly, when determining if the data stored in the second storage medium 106 has updates, the server 102 may compare the properties and/or filter conditions of the replica table 116 stored in the second storage medium 106 to those of the source table 114 stored in the first storage medium 104. If there are some updates to the properties and/or filter conditions of the replica, the server 102 may forward the requests to the first storage medium 104 for retrieval of the relevant portion(s) of data from the source table 114. Otherwise, if there are no updates to the properties and/or filter conditions, the server 102 may forward the requests to the second storage medium 106 for retrieval of the requested portion(s) of data from the replica table 116.

Moreover, even if there are no updates, the server 102 may determine that the replica table 116's replicate data 122 stored at the second storage medium 106 is too stale. Specifically, as explained above, the server 102 may determine whether the replica table 116 was last updated (e.g., previous update time) within an acceptable update time. As stated previously, if the replicable table 116 was updated within the acceptable update time, the server 102 may determine that the replicate data 122 is not stale and thus forward the request to the second storage medium 106. Otherwise (if the replica table 116 was not last updated within an acceptable update time), the server 102 may determine that the replicate data 122 is stale and forward the request to the first storage medium 104. By routing requests in such a fashion, the server 102 is able to provide faster responses times and to properly and efficiently utilize both the first storage medium 104 and the second storage medium 106.

Upon receipt of the request, the first storage medium 104 and/or the second storage medium 106 may retrieve the data from an appropriate location (e.g., database and/or table). The first storage medium 104 and/or the second storage medium 106 may send the data to the server 102, which will then forward it to the client devices 108. Alternatively, the first storage medium 104 and/or the second storage medium 106 may send the data directly to the client devices 108.

Figure 2:
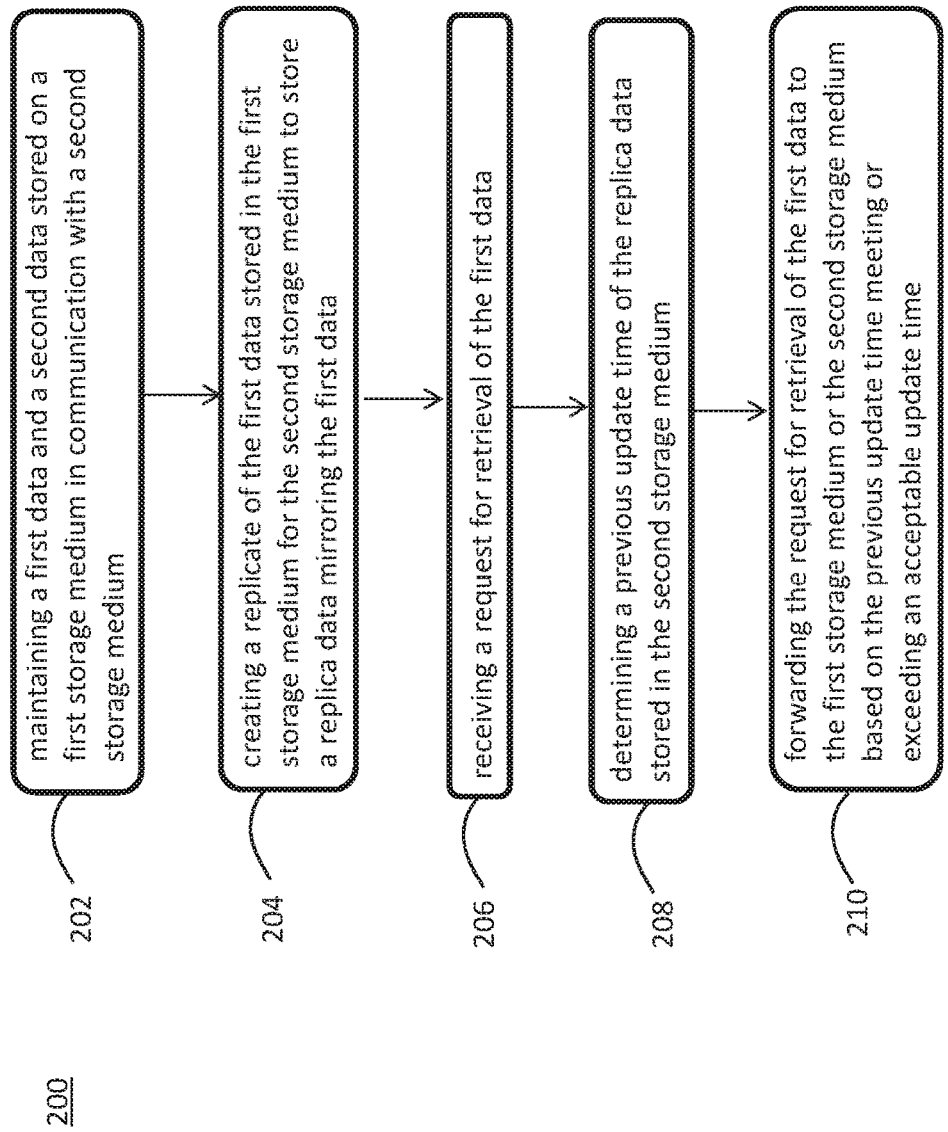
FIGS. 2 and 3 are flowcharts illustrating processes for appropriately routing requests for data stored in multiple storage mediums, according to some embodiments.
Figure 3:
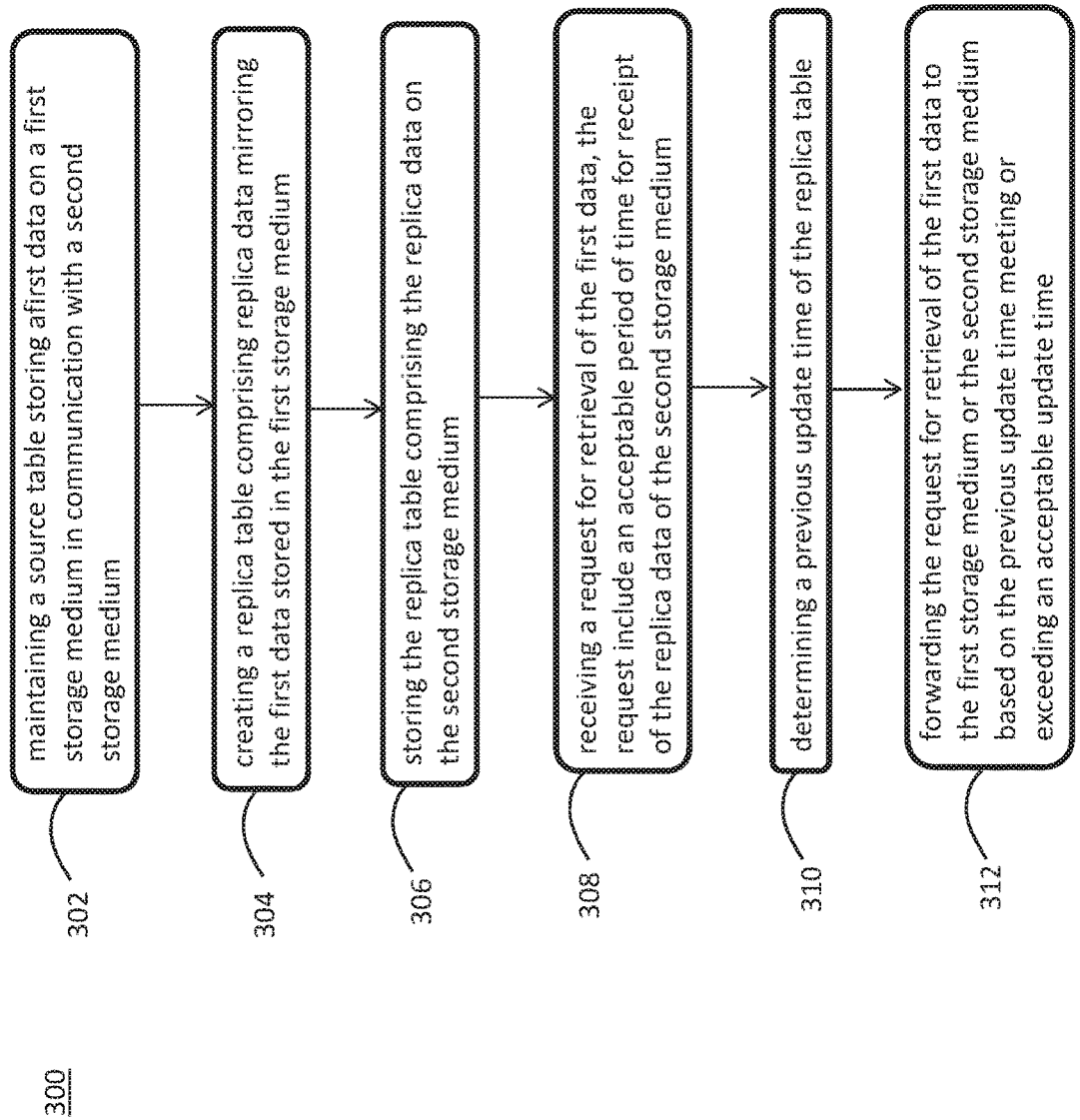

FIGS. 2 and 3 are flowcharts for a methods 200 and 300 for appropriately routing requests for data stored in multiple storage mediums, according to example embodiments. Methods 200 and 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 2 and 3, as will be understood by a person of ordinary skill in the art.

Methods 200 and 300 shall be described with reference to FIG. 1. However, methods 200 and 300 are not limited to that example embodiment Referring now to FIG. 2, in 202, server 102 maintains first data 118 and second data 120 stored in the first storage medium 104 in communication with the second storage medium 106. The first storage medium 104 may receive the first data 118 and second data 120 prior to such data being sent to the second storage medium 106 (or, the new data may not be sent to the second storage medium 106). Along these lines, the first storage medium 104 may be a memory-based storage medium, and the second storage medium 106 may be a disk-based storage medium. As such, the first storage medium 104 may have faster processing and data access capabilities than the second storage medium 106.

In 204, server 102 creates a replicate (called replica data 122) of the first data 118 stored in the first storage medium 104. The server 102 stores the replica data 122 in the second storage medium 106 so as to mirror the first data 118 in the first storage medium 104. The replicate data 122 may be created after a predetermined amount of time that the first data 118 is received and/or stored by the first storage medium 104, as determined by an authorized user (e.g., seconds or minutes).

In 206, server 102 receives a request for retrieval of the first data 118 from the client device 108. The request may be before, during and/or after the process of replicating the first data 118 from the first storage medium 104 to the second storage medium 106 in 204.

In 208, server 102 determines a previous update time of the replica data 122 stored in the second storage medium 106. The previous update time may be a period of time between a first point of time that the second storage medium 106 receives the first data 118 (that is, the replica data 122) and a second point of time of receiving the request for the first data 118 from the client devices 108. Accordingly, the previous update time may be indicative of a likelihood that the first data 118 is stored in the second storage medium 106 (that is, the likelihood that the replica data 122 is current). Moreover, the previous update time may be different than the acceptable update time for creation of the replica data 122. For example, the previous update time may be less than the acceptable update time for creation of the replica data 122.

In 210, server 102 forwards the request for retrieval of the first data 118 to the first storage medium 104 or the second storage medium 106 based on the previous update time meeting or exceeding an acceptable update time. As such, the previous update time may be compared to the acceptable update time. For example, if the previous update time is below the acceptable update time, the server 102 may forward the request to the second storage medium 106. However, if the previous update time is greater than the acceptable update time, the server 102 may forward the request to the first storage medium 104. Upon receiving the request, the first storage medium 104 and/or the second storage medium 106 may forward the first data 118 or replica data 122 to the client device 108, either directly or via the server 102.

Referring now to FIG. 3, in 302, the server 102 may maintain a source table 114 storing a first data 118 on a first storage medium 104 in communication with a second storage medium 106. As such, the first storage medium 104's source table 114 may be utilized to receive and store new data including at least the first data 118. Along these lines, the first storage medium 104 may be primarily utilized for write-intensive operations, and the second storage medium 106 may be primarily utilized for read operations. However, as will be described in more detail below, the first storage medium 104 may be also utilized for read-intensive operations.

In 304, the server 102 may create a replica table 116 comprising relica data 122 mirroring the source table 114's first data 118. The replicate data 122 may be created after a predetermined amount of time that the first data 118 was originally received and/or stored by the first storage medium 104, as determined by an authorized user (e.g., seconds or minutes).

In 306, the server 102 may store the replica table 116 comprising the replica data 122 on the second storage medium 106.

In 308, the server 102 may receive a request for retrieval of the first data 118. The request may be from the client device 108. As such, the client device 108 may send the request before, during and/or after the process of replicating the first data 118 from the first storage medium 104 to the second storage medium 106 in 304. In some cases, as described above, the request may indicate an acceptable update time for the receipt of the replica table 116's replica data 122 instead of the source table 114's first data 118. Accordingly, even though the request includes an acceptable update time for receipt of the replica tables 116's replica data 122, the client device 108 that requested the first data 118 may be unaware of whether the replication of the source tables 114's first data 118 to the replica table 116 has been started and/or completed. Thus, the client device 108 requesting the first data 118 may be unaware of the process of method 300 including 304 and/or 306.

In 310, server 102 determines a previous update time of the second storage medium 106 in receiving the replica data 122 stored in the replica table 116. As stated in 210, the previous update time may be a period of time between a first point of time that the second storage medium 106 receives the first data 118 (that is, the replica data 122) and a second point of time of receiving the request for the first data 118 from the client devices 108. Accordingly, the previous update time may be indicative of a likelihood that the first data 118 is stored in the second storage medium 106 (that is, the likelihood that the replica data 122 is current). Moreover, the previous update time may be different than the acceptable update time for creation of the replica data 122. For example, the previous update time may be less than the acceptable update time for creation of the replica data 122

In 312, server 102 forwards the request for retrieval of the first data 118 to the first storage medium 104 or the second storage medium 106 based on the previous update time meeting or exceeding an acceptable update time, in a similar fashion as described in 208. Specifically, for example, server 102 may compare the previous update time to the acceptable update time. If the previous update time is below the acceptable update time, the server 102 may forward the request to the second storage medium 106. In contrast, if the previous update time is greater than the acceptable update time, the server 102 may forward the request to the first storage medium 104. Upon receiving the request, the first storage medium 104 and/or the second storage medium 106 may forward the first data 118 or replica data 122 to the client device 108, either directly or via the server 102.

Figure 4:
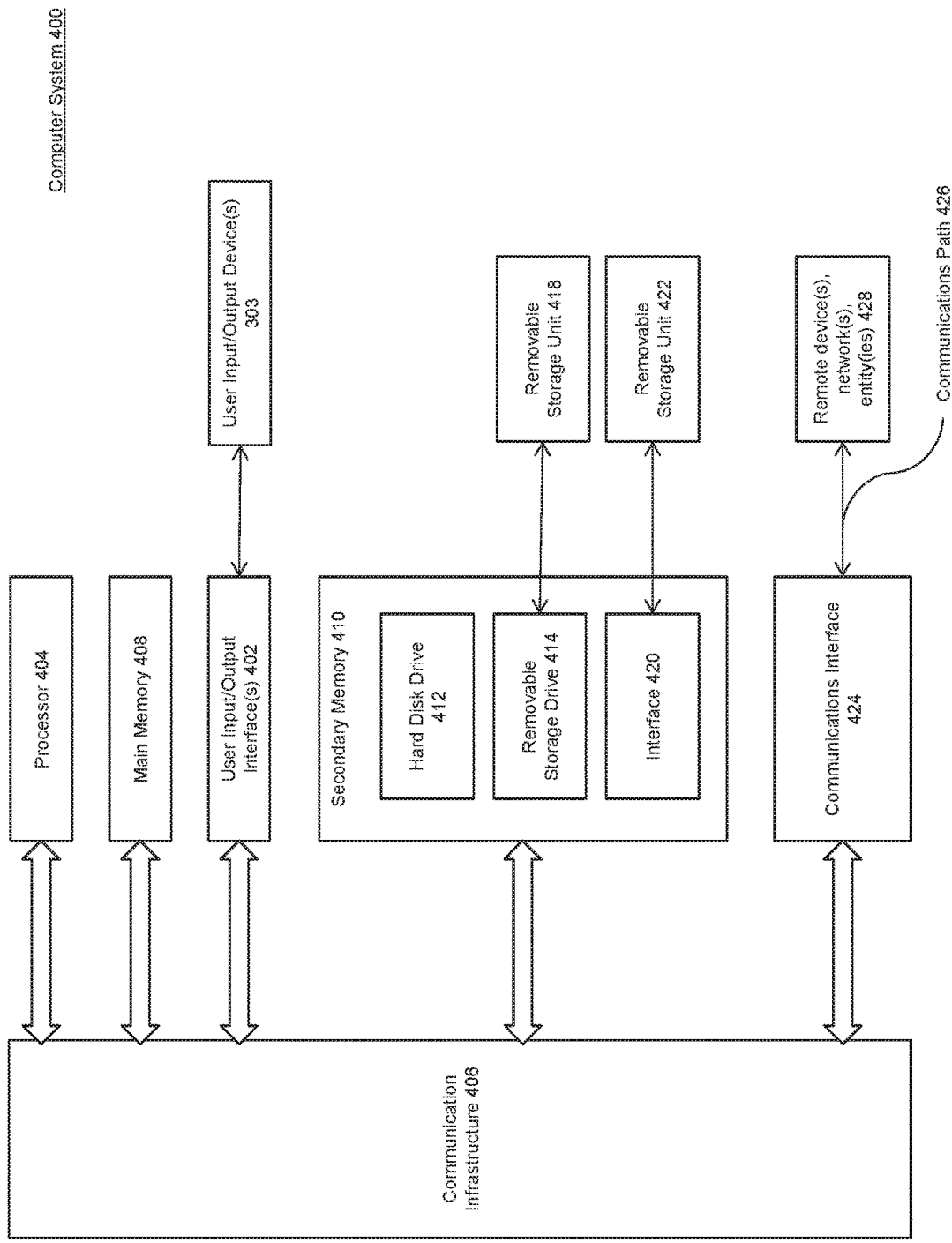
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to a removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for coordinating a request for retrieval of data shared between a first and second storage medium, comprising:
    maintaining, by at least one processor, a first data and a second data stored in a first storage medium in communication with a second storage medium;
    creating, by the at least one processor, a replicate of the first data stored in the first storage medium for the second storage medium to store a replica data mirroring the first data;
    receiving, by the at least one processor, a request for retrieval of the first data;
    determining, by the at least one processor, a previous update time associated with the second storage medium, wherein the previous update time is an actual period of time between a first point of time that the second storage medium receives the replica data and a second point of time that the first storage medium receives the first data and the second data;
    comparing the previous update time to an acceptable update time,
    wherein the acceptable update time is an acceptable period of time between a first point of time that the second storage medium receives the replica data and a second point of time that the first storage medium receives the first data and the second data; and
    forwarding, by the at least one processor, the request for retrieval of the first data to the first storage medium or the second storage medium based on the comparing the previous update time to the acceptable update time,
    wherein at least one of the maintaining, creating, receiving, determining, and forwarding is performed by one or more computers.

2. The computer-implemented method of claim 1, wherein the first storage medium maintains a source table storing the first data and second data, and the second storage medium maintains a replica table storing the replica data.

3. The computer-implemented method of claim 2, wherein the first storage medium has faster processing power and data access than the second storage medium.

4. The computer-implemented method of claim 3, wherein the first storage medium is a memory-based storage medium and the second storage medium is a disk-based storage medium.

5. The computer-implemented method of claim 4, further comprising:
    receiving, by the at least one processor, the first data and the second data; and
    providing, by the at least one processor, the first data and the second data into the first storage medium.

6. The computer-implemented method of claim 2, the creating further comprising:
    replicating, by the at least one processor, one or more properties of the source table containing the first data and the second data stored in the first storage medium, wherein the one or more properties include a name, a version, a number of columns, and a number of rows of the source table;
    replicating, by the at least one processor, the first data stored in the source table of the first storage medium;
    associating, by the at least one processor, the first data with the one or more of the properties of the source table; and
    creating, by the at least one processor, the replica table containing the one or more properties of the source table and the first data stored in the source table of the first storage medium for the second storage medium.

7. The computer-implemented method of claim 6,
    determining, by the at least one processor, that the one or more properties of the source table are the same as the one or more properties of the replica table,
    wherein the forwarding of the request for retrieval of the first data is further based on the one or more properties of the source table being the same as the one or more properties of the replica table.

8. The computer-implemented method of claim 1, wherein the request is forwarded to the second storage medium when the previous update time is below the acceptable update time.

9. The computer-implemented method of claim 1, wherein the acceptable update time is provided by an authorized individual.

10. The computer-implemented method of claim 1, wherein the acceptable update time is provided in the request.

11. The computer-implemented method of claim 1, further comprising:
    determining, by the at least one processor, a status in a process of creating the replicate of the first data and the second data,
    wherein the status includes at least enabled and disabled, and
    wherein the forwarding of the request for retrieval of the first data is further based on the status.

12. The computer-implemented method of claim 1, further comprising:
    receiving, by the at least one processor, one or more updates relating to at least one of the first data and the second data; and
    maintaining, by the at least one processor, a log containing the one or more updates.

13. The computer-implemented method of claim 12, further comprising:

determining, by the at least one processor, whether the first data stored in the second storage medium is up-to-date based on the one or more updates, wherein the forwarding of the request for retrieval of the first data is further based on the first data stored in the second storage medium being up-to-date.

14. A system, comprising:

a memory; and at least one processor coupled to the memory and configured to:

maintain a first data and a second data stored in a first storage medium in communication with a second storage medium;

create a replicate of the first data stored in the first storage medium for the second storage medium to store a replica data mirroring the first data;

receive a request for retrieval of the first data;

determine a previous update time associated with the second storage medium, wherein the previous update time is an actual period of time between a first point of time that the second storage medium receives the replica data and a second point of time that the first storage medium receives the first data and the second data;

execute a comparison of the previous update time to an acceptable update time, wherein the acceptable update time is an acceptable period of time between a first point of time that the second storage medium receives the replica data and a second point of time that the first storage medium receives the first data and the second data; and forward the request for retrieval of the first data to the first storage medium or the second storage medium based on the comparison of the previous update time to the acceptable update time.

15. The system of claim 14, wherein the request for retrieval is forwarded to the second storage medium when the previous update time is below the acceptable update time.

16. A non-transitory computer-readable medium having instructions stored thereon that, when executed by at least one computing device, cause the at least one computing device to perform operations comprising:

maintaining a first data and a second data stored in a first storage medium in communication with a second storage medium;

creating a replicate of the first data stored in the first storage medium for the second storage medium to store a replica data mirroring the first data;

receiving a request for retrieval of the first data;

determining a previous update time associated with the second storage medium, wherein the previous update time is an actual period of time between a first point of time that the second storage medium receives the replica data and a second point of time that the first storage medium receives the first data and the second data;

comparing the previous update time to an acceptable update time, wherein the acceptable update time is an acceptable period of time between a first point of time that the second storage medium receives the replica data and a second point of time that the first storage medium receives the first data and the second data; and forwarding the request for retrieval of the first data to the first storage medium or the second storage medium based on the comparing the previous update time to the acceptable update time.

17. The non-transitory computer-readable medium of claim 16, wherein the acceptable update time is provided in the request.

18. The non-transitory computer-readable medium of claim 16, the operation of creating further comprising:

replicating one or more properties of the source table containing the first data and the second data stored in the first storage medium, wherein the one or more properties include a name, a version, a number of columns, and a number of rows of the source table;

replicating the first data stored in the source table of the first storage medium;

associating the first data with the one or more of the properties of the source table; and creating the replica table containing the one or more properties of the source table and the first data stored in the source table of the first storage medium for the second storage medium, wherein the forwarding of the request for retrieval of the first data is further based on the one or more properties of the source table being the same as the one or more properties of the replica table.

19. The system of claim 14, wherein the acceptable update time is provided in the request.

20. The system of claim 14, wherein the request is forwarded to the second storage medium when the previous update time is below the acceptable update time.

* * * * *